United States Patent [19]

Williams

[11] 4,423,710

[45] Jan. 3, 1984

[54] HIGH COMPRESSION ROTARY ENGINE

[76] Inventor: Robert H. Williams, Rt. 2, Box 44, Bandera, Tex. 78003

[21] Appl. No.: 319,731

[22] Filed: Nov. 9, 1981

[51] Int. Cl.³ .............................................. F02B 53/00
[52] U.S. Cl. .................................... 123/228; 418/248
[58] Field of Search ............... 123/205, 228, 242, 244; 418/61 R, 63, 112, 248

[56] References Cited

U.S. PATENT DOCUMENTS

| 859,474 | 7/1907 | Williams | 123/228 |
|---|---|---|---|
| 1,199,489 | 9/1916 | Nield | 123/228 |
| 1,334,906 | 3/1920 | Keith | 418/112 X |
| 3,809,024 | 5/1974 | Abbey | 123/244 |
| 4,080,935 | 3/1978 | Olson | 123/244 X |
| 4,286,555 | 9/1981 | Williams | 123/228 |

FOREIGN PATENT DOCUMENTS 1426036 9/1969 Fed. Rep. of Germany ...... 123/242

Primary Examiner—Michael Koczo

[57] ABSTRACT

A rotary internal combustion engine comprising a cylinder bore in a stator sealed between parallel end walls; a power shaft concentric with the cylinder bore journaled in bearings in the end walls; an annular eccentric piston fixed onto the engine shaft just clearing the end walls and the cylinder as it rotates. A first abutment with one end pivotally anchored in the stator near 10:00 o'clock, the other end projecting clockwise and free to swing vertically in the cylinder space, seals the space between the cylinder and the piston from end wall to end wall, forming the counter-clockwise end of a combustion-expansion chamber. A second abutment, pivotally anchored in the stator near 2:00 o'clock, its free end projecting counter-clockwise and sealing the space between the cylinder and piston from end wall to end wall, forms the clockwise end of the combustion-expansion chamber. Both abutments are spring biased downward toward the piston. The combustion chamber, centered near 12:00 o'clock, comprises a shallow arcuate cavity adjacent the path of the piston, opening into and combining with the cylinder space. Fuel injection means for the invention engine is mounted preferably in the engine head. An air intake port is positioned in the vicinity of 3:00 o'clock to admit air into a compression chamber formed ahead of the rotating eccentric piston, the air pressure to lift the free end of the first abutment to allow the piston head to sweep a charge of air into the combustion chamber. Exhaust means comprises preferably at least one poppet valve per cylinder positioned in the engine head.

2 Claims, 3 Drawing Figures

HIGH COMPRESSION ROTARY ENGINE

SUMMARY OF THE INVENTION

The invention engine resembles my U.S. Pat. No. 4,286,555, a principal difference being that in the earlier design the piston and the rotor were separate parts, the piston comprising a free-floating sleeve slipped over and concentric with the annular eccentrically mounted rotor. In the invention engine the rotor is annular and eccentrically fixed to the engine shaft, and it also is the piston. Unlike the earlier design, this engine is fitted with a spring-biased wiper vane in a slot across the piston head from end wall to end wall to yieldably engage the cylinder to drive air ahead of it. This combination is designed to raise the air pressure in the combustion chamber considerably higher than is possible with the free-floating sleeve piston cited above, up to 200 pounds per square inch or a little higher, affording a compression ratio of thirteen- or fourteen-to-one; and, like a diesel engine, it is intended to use all the air available at all times, the operator varying the speed and power of the engine by varying the quantity of fuel injected. Depending on the volume of the cylinder bore and the displacement volume of the rotor, this engine normally ingests two to three times as much air as a conventional piston engine can inhale (without a supercharger).

The design of the invention engine makes possible an extremely simple and effective type of prechamber for fuel injection, without requiring extra boring or casting in the stator and without adding volumetric clearance, which prechamber, subchamber 23a, not only serves the usual purpose of such a device, that of enabling the engine to ignite and burn a comparatively thin charge of fuel, but also, by firing the fuel charge a number of degrees earlier than the usual firing of a fuel charge in a conventional piston engine, and by leaking the flame gradually out of the prechamber into the main combustion chamber, it prolongs the expansion stroke by ten to twenty degrees of engine shaft rotation, and by a corresponding increase in the length of time for the fuel to burn up.

It is well known that rotary engines have traditionally presented a sealing problem. Most rotary designers have attempted to use a sliding vane seal across the piston head against which vane the expanding gases of combustion are expected to impinge to drive the eccentric piston forward; but the industry has not been able, even with springs behind the vane seal, to make that seal expand outward as the piston rotates and as the expansion chamber widens, to maintain sealing engagement with the cylinder; the pressure of combustion gases against the side of the vane seal is so great that it binds the seal in its slot. The Wankel rotary, though sealed well enough to get into small scale production, suffers from "blow-by" at its three apex seals.

Another problem with many rotary engine designs is a loss of efficiency due to the shape of the expansion chamber in relation to the combustion chamber. As the expanding gases push against the rotor head and follow it around inside the cylinder, they flow into a widening chamber, allowing the gases to expand radially into volumetric clearance where they accomplish no work. This problem is inherent in, for instance, the Wankel design, which, though admirably simple and with a comparatively light "pumping load," cannot make full use of the fuel it ingests.

The invention engine, like its predecessor previously cited, by holding the gases of combustion in the combustion chamber between pivoting abutments, which let the chamber expand downward into the cylinder space as the eccentric piston recedes, affords an improved sealing system. The design of the invention engine also provides a combustion-expansion chamber relationship which is more efficient in shape, especially because of the cylindrical enlargements on the abutments, recited herein. Instead of widening as the power stroke advances, the combustion-expansion chamber herein actually narrows somewhat during the last part of the power stroke. The narrowing shape, probably unique in engine designs, can only mean longer retention of the heat of combustion, with more efficient use of fuel and with a cleaner exhaust.

DETAILED DESCRIPTION OF PREFERRED EMBODIMENTS

Figure 1:
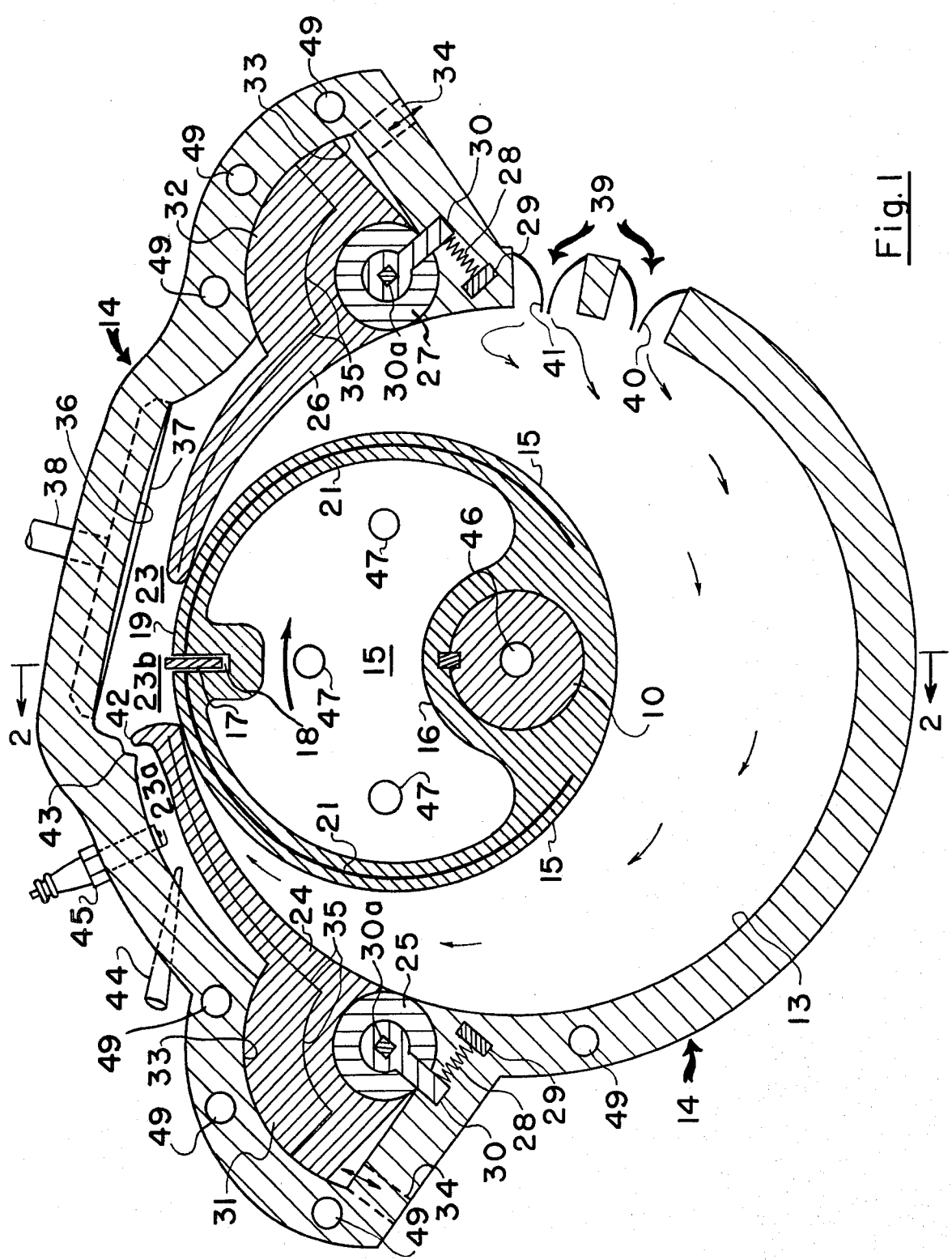
FIG. 1 is an end view of the invention engine with the end wall removed, showing the rotary piston with its head at 12:00 o'clock, ten to twenty degrees past ignition, traveling clockwise.
Figure 2:
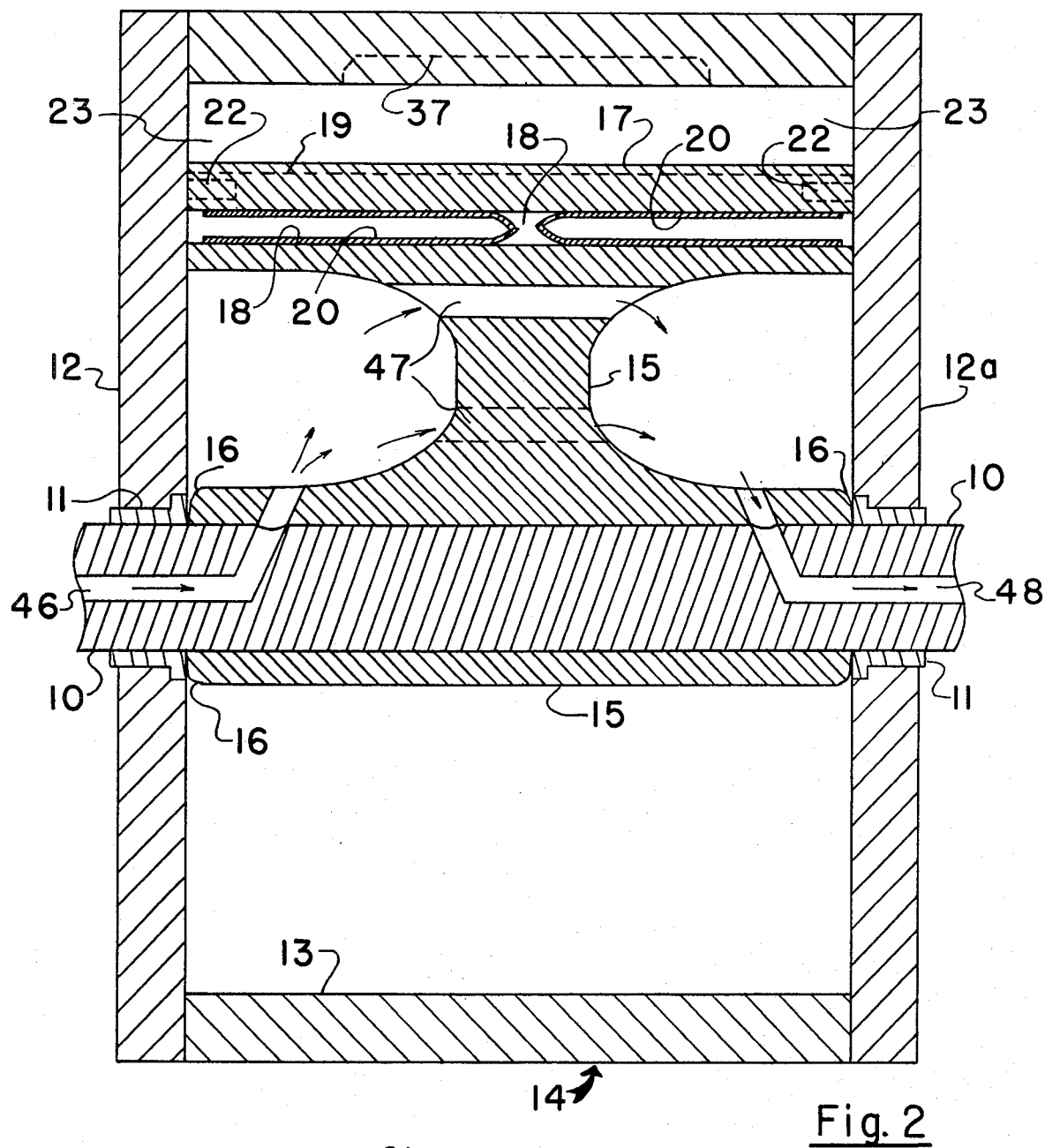
FIG. 2 is a transverse section taken in the plane indicated by line 2—2 in FIG. 1 showing the piston head, the wiper blade with the springs under it, and showing the cooling oil circulatory system via bores in the engine shaft and rotor web.
Figure 3:
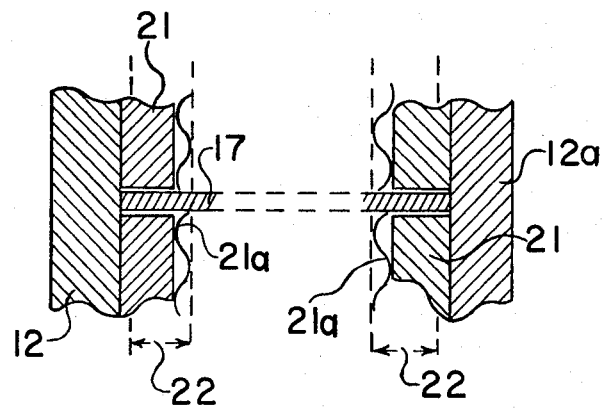
FIG. 3 is a fragmented representation looking down on the wiper blade, in which a perspective is flattened into a plan view for clarity, especially to show the S-shape of the springs behind the end seals.

An engine shaft 10 is journaled in bearings 11 in parallel end walls 12 and 12a, which seal between them a cylinder bore, 13, in stator 14, the cylinder bore concentric with the engine shaft. An annular rotor, 15, is fixed eccentrically to the shaft, its ends barely clearing the end walls and its head barely clearing the cylinder bore. Rotor hubs 16 bear against bearings 11. A wiper blade, 17, is installed in slot 18 across the head 19 of the rotor, the blade biased outward by springs 20 to sweep the face of the cylinder to serve as an air pump for the engine. At least one end seal 21, biased outward by spring 21a in slot 22, is provided on each end of the rotor to yieldably sweep its respective end wall to prevent leakage of combustion gases between the end of the rotor and the end wall. Each end seal is severed at the wiper blade and the severed ends are butted against the wiper. A combustion chamber 23, with sub-chambers 23a and 23b, comprises a cavity in the stator centered near 12:00 o'clock, adjacent to the path of the rotor head, the cavity communicating with the cylinder bore. A first abutment 24, a fluid barrier, is pivotally anchored in the stator on pivot 25, which is centered in the vicinity of 10:00 o'clock, the pivot parallel to the engine shaft, the abutment comprising a rectangular metal plate projecting clockwise from its pivotal anchorage into the cylinder space, its clockwise end free to swing vertically in the cylinder space, the free end riding on the rotating piston during combustion, the abutment closing the counter-clockwise end of the combustion-expansion chamber, the free end to be automatically lifted off the rotor by air pressure under it when an exhaust port opens in the expansion chamber, to let air compressed ahead of the wiper blade flow into the combustion chamber. The under face of the abutment is arcuate on a radius not shorter than that of the cylinder bore so that it becomes, in effect, an extension of the face of the cylinder for compression purposes, the wiper blade sweeping it to the end of the compression stroke.

A second abutment, 26, is anchored in the stator on pivot 27, which is centered in the vicinity of 2:00 o'clock and is parallel to the engine shaft, this abutment comprising a rectangular metal plate similar to the first abutment but projecting counter-clockwise from its anchorage, its projecting end free to swing vertically in the cylinder space and riding at all times on the face of the rotor, this abutment forming the clockwise end of the combustion-expansion chamber. The second abutment is arcuate on its under side on a radius sufficiently short to prevent the rotor head, while passing under it, from lifting the abutment's free end off the rotor. Both abutments are biased downward at all times in the direction of the rotor by springs 28 outside at least one end wall, the springs based on lugs 29 on the end wall and pushing upward against arms 30 which are fixed to hubs 30a on projecting ends of the pivots. Abutment 24 is preferably enlarged at its pivoted end by a section 31 of a cylinder, concentric with pivot 25; and abutment 26 is similarly enlarged at 32. These cylindrical enlargements are designed to oscillate in closely fitting cavities 33 in the stator with breather ports 34 venting the cavities, and are fitted with end seals 35 to slidably engage the end walls. The primary function of the enlargements is to narrow the combustion-expansion chamber to confine the combustion gases closer to the center of the chamber, where they can bear downward on the abutments with greater leverage.

The engine head above combustion subchamber 23b is substantially flattened at 36 over an area large enough to make room for poppet exhaust valve 37, on valve stem 38. The valve is positioned to open downward into the combustion-expansion chamber at the end of the expansion stroke, when the rotor head is in the vicinity of 4:00 o'clock, to let compressed air ahead of the wiper blade sweep spent gases from the engine, the valve timed to close when the engine head is near 6:30 o'clock to let the combustion chamber catch the next charge of compressed air.

Ports 39, centered near 3:00 o'clock, equipped with one-way inlet valves 40 and 41, admit air to the cylinder bore. A function of the rotor head, with the wiper blade, is to generate a suction in its wake, drawing air into the cylinder, and at the same time to compress the air ahead of it which was ingested during the preceding revolution. Spring tension which causes the first abutment to bear downward on the rotor is adjusted to let compressed air lift the free end of that abutment off the face of the rotor promptly after the exhaust port opens so that the pressurized air will quickly sweep the expansion chamber clean of spent gases.

Ridge 42 across the upper edge of the free end of abutment 24 is positioned to mate with shallow groove 43 across the under side of the engine head while the rotor head is passing under the abutment's free end to substantially close off subchamber 23a from main chamber 23 long enough to allow a charge of fuel to be injected into the subchamber and ignited. Fuel injector 44 and spark plug 45 are installed to project into subchamber 23a, which has the function of a prechamber for fuel injection. The smaller volume of air trapped in the subchamber provides a richer fuel-air mixture than if the same fuel charge is injected into the larger chamber; therefore a mixture too lean to be dependably ignited in main chamber 23 can be ignited in prechamber 23a. Fuel injection and ignition are timed to take place while the rotor head is passing under the free end of the first abutment, while subchamber 23a is virtually closed off. The receding face of the eccentric piston, as it travels on, allows the abutment end to begin dropping away from the engine head immediately after ignition, letting the burning gases flow out into the main chamber to fire that chamber. Because the dropping away of the abutment end is gradual, the flame spreads into the main chamber somewhat gradually, avoiding a hammering effect and avoiding a peak of heat, which would generate more nitrous oxides. Also, by allowing the expansion stroke to begin ten to twenty degrees (of engine shaft rotation) earlier than the combustion process in conventional engines and because of the gradual spreading of the flame through the main chamber, the prechamber produces an expansion stroke substantially longer than that in conventional engines, allowing more time for the fuel to be consumed.

Oil duct 46 in engine shaft 10 provides conduit for pressurized cooling oil into the space between the first end wall and the rotor web; bores 47 through the web let the oil flow through to the opposite side of the rotor; and duct 48 in the engine shaft conducts the oil out the side of the engine opposite duct 46. The oil, in addition to cooling the rotor and lubricating bearings 11, smears the end walls with lubricant which partially transfers to end seals 21. Other lubrication means, such as an oil mist in the ingested air, are, of course, optional.

A distinguishing characteristic of this engine is the great volume of air pumped into the combustion chamber. With careful machining of component parts, the engine head and wiper blade combination is capable of maintaining a seal with the cylinder tight enough to raise compression well above that ordinarily used in reciprocating piston engines; and the cubic volume of the cylinder, after subtracting the displacement volume of the rotary piston, can supply two to three times the quantity of air which a piston engine of equal displacement can inhale (without a supercharger). The cubic capacity of the combustion chamber is calculated to produce a compression ratio in this engine of thirteen or fourteen to one, since all the available air is used. The volume of air together with the function of the prechamber, makes the invention engine well suited to fuel injection.

OPERATION OF THE ENGINE

This rotary internal combustion engine has the four phases of intake, compression, expansion and exhaust with each revolution of the engine shaft, 10. FIG. 1 shows an end view of the engine with an end wall removed and with head 19 of the eccentrically mounted rotor at 12:00 o'clock, the rotor traveling clockwise, impelled by a conventional starter (not shown). As soon as wiper blade 17 engages the under face of abutment 26 it begins to push air ahead of it; and after it passes intake ports 39 it begins to draw air in through those ports to be compressed during the next revolution of the piston. The air pressure ahead of the wiper lifts the free end of abutment 24 off piston 15 against preadjusted spring tension, so that the compressor drives air directly into combustion chamber 23. As the piston head passes under and engages the free end of the first abutment it lifts that end so that ridge 42 across its upper edge mates with shallow, transverse groove 43 on the under side of the engine head, trapping a comparatively small volume of air in subchamber 23a, which functions as a prechamber. Fuel injector 44 sprays a fuel charge into the subchamber and spark plug 45 ignites it, and the expanding gases of combustion begin to bear downward on the first abutment whose free end bears against the eccentric head of the piston, causing it to rotate, turning the engine shaft. Almost instantaneously the passing of the piston head lets the free end of the abutment begin dropping away from the engine head, and the burning gases begin to flow out from the prechamber to ignite the main chamber, expanding gases in that chamber bearing downward on the second abutment, applying additional pressure against the eccentric piston. As has been explained previously, the functioning of the prechamber, bringing about an early ignition and early application of power against the piston head, and the gradual burning of the gases throughout the main combustion chamber, together prolong the power stroke, allowing the fuel more time to be consumed.

When the rotor head reaches the vicinity of 4:00 o'clock, the end of the power stroke, poppet valve 37 opens and the air, already lightly compressed ahead of the wiper blade, lifts the free end of the first abutment against the spring tension and scavenges the engine. The valve is timed to close when the piston head reaches the vicinity of 6:30 o'clock to let the combustion chamber catch the next charge of compressed air, and the cycle repeats. Flywheel inertia and/or multiple cylinders pull the piston through the next compression stroke and help keep the engine running.

I claim:

1. A rotary internal combustion engine having the four-phase cycle of intake, compression, expansion and exhaust with each revolution of the engine shaft, the engine comprising:
   a stator with a cylinder bore sealed between parallel end walls;
   an engine shaft journaled in bearings in the end walls, concentric with the cylinder bore;
   an eccentric annular rotary piston fixed to the engine shaft, the piston substantially coextensive with the end walls, its head fitted with a spring-biased wiper vane in a transverse slot to yieldably sweep the cylinder to push air ahead of it throughout a compression stroke;
   a combustion-expansion chamber comprising a shallow arcuate cavity in the upper part of the stator centered near 12:00 o'clock, adjacent to the path of the piston head, communicating with the cylinder space;
   a first abutment having a first end pivotally secured to the stator near 10:00 o'clock and a second end projecting clockwise and free to swing vertically in the cylinder space, the abutment long enough to make tangential sealing engagement with the piston in all positions of the piston, the under side of the abutment arcuate on a radius not shorter than that of the cylinder;
   a second abutment having a first end pivotally secured to the stator near 2:00 o'clock and a second end projecting counter-clockwise in the cylinder space, the abutment free to swing vertically in the cylinder and long enough to make tangential sealing engagement with the piston in all positions of the piston, the under side of the abutment arcuate on a radius short enough to insure that the piston head, while passing under the abutment, not lift the free end of the abutment off the face of the piston;
   both first and second abutments making sliding sealing engagement with both end walls and with the piston to enclose the combustion chamber above them to insure that during combustion, the expanding gases bear down on the three elements to cause the eccentric piston head to rotate, turning the engine shaft;
   each abutment spring biased downward toward the piston by a spring outside the engine wall, the spring based on a lug cast on the wall and bearing upward against a lever which lever is keyed to an extension of the abutment pivot through the end wall, to which pivot the abutment is also fixed;
   spring tension on the first abutment adjusted to allow the free end of that abutment to be forced upward off the face of the piston by compressed air in front of the piston head promptly after an exhaust valve opens inside the combustion-expansion chamber, the upward lifted abutment end constituting an inlet port to allow air to be compressed directly into the combustion chamber;
   at least one inlet port fitted with at least one one-way inlet valve to admit air to the cylinder;
   exhaust means comprising at least one poppet valve positioned in the engine head to open into the expansion chamber at the end of a power stroke to allow the engine to be scavenged of spent gases, the valve timed to close in time to allow the combustion chamber to catch the next charge of compressed air;
   means for introducing a charge of fuel into the combustion chamber in timed relation to the position of the piston head, the means constituting a fuel injector installed to project into the combustion chamber;
   means for firing the fuel charge as it is injected, the means comprising a spark plug, positioned in close proximity to the fuel injector;
   each of the two abutments enlarged on its upper face at its pivoted end to reshape the combustion-expansion chamber to confine the combustion gases more centrally over the free ends of the abutments to partially reduce the downward pressure of combustion on the abutment, to reduce friction where the free end of the abutment rides on the face of the rotating piston, each enlargement comprising a section of a drum-shaped cylinder virtually coextensive with the end walls and parallel to and concentric with its respective pivot;
   a close-fitting cavity machined in the stator for each abutment enlargement, to receive the enlargement as it is forced upward by the piston during the compression stroke.

2. The engine of claim 1 including a ridge across the upper edge of the free end of the first abutment to mate with a closely fitting recess on the under face of the stator while the piston head passes under the abutment's free end, the function of the mating of the ridge with the recess being to momentarily close off from the main combustion chamber a small subchamber, so that a charge of fuel too lean to ignite if injected into the greater quantity of air in the main chamber can be ignited when injected into the subchamber, the closing mechanism being of such design that the passing of the piston allows the subchamber to open to fire the main chamber;
   the means for injecting fuel comprising a fuel injector installed to project into the subchamber; and the means for igniting the fuel comprising a spark plug installed to project into the subchamber, in close proximity to the fuel injector.

* * * * *